(12) United States Patent
Wang

(10) Patent No.: US 10,875,439 B2
(45) Date of Patent: Dec. 29, 2020

(54) SPLIT-TYPE CAR CIGARETTE LIGHTER

(71) Applicant: Shenzhen Jiemeisi Industrial Co., Ltd., Shenzhen (CN)

(72) Inventor: Liming Wang, Shenzhen (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 374 days.

(21) Appl. No.: 15/974,712

(22) Filed: May 9, 2018

(65) Prior Publication Data

US 2019/0308542 A1 Oct. 10, 2019

(30) Foreign Application Priority Data

Apr. 4, 2018 (CN) ............ 2018 1 0301890

(51) Int. Cl.
*H05B 3/40* (2006.01)
*H05B 3/48* (2006.01)
*B60N 3/14* (2006.01)

(52) U.S. Cl.
CPC .................. *B60N 3/14* (2013.01)

(58) Field of Classification Search
CPC . H05B 1/0236; H05B 3/0042; H05B 3/40–50
See application file for complete search history.

(56) References Cited

U.S. PATENT DOCUMENTS

| | | | | |
|---|---|---|---|---|
| 8,371,709 B2* | 2/2013 | Cheng | ............... | B60N 3/14 362/183 |
| 2013/0043230 A1* | 2/2013 | Schwarzbach | ....... | H05B 1/0213 219/202 |
| 2013/0200063 A1* | 8/2013 | Cooke | ............ | A47J 41/0044 219/439 |
| 2014/0123989 A1* | 5/2014 | LaMothe | ............ | H05B 3/06 131/328 |
| 2015/0245659 A1* | 9/2015 | DePiano | ............ | B21D 53/06 392/397 |
| 2015/0313287 A1* | 11/2015 | Verleur | ............ | A24F 47/008 131/329 |
| 2016/0345626 A1* | 12/2016 | Wong | ............ | H02J 7/0045 |
| 2019/0116880 A1* | 4/2019 | Lau | ............ | H05B 3/46 |

* cited by examiner

*Primary Examiner* — Michael A Laflame, Jr.

(57) ABSTRACT

A split-type car cigarette lighter includes a cigarette lighting device and a car charging device movably connected to the cigarette lighting device. The cigarette lighting device includes a first housing formed a first receiving room therein for receiving a first PCB and a battery therein, and a heating plate electrically connected to the first PCB. The battery is tightly fixed with the first housing and electrically connected to the first PCB. Both the heating plate and the first PCB are tightly fixed with the first housing. the heating plate is electrically connected to the at least one electrical contact when the cigarette lighting device is partially received in the first mounting recess and movably connected to the second housing. The structure can accordingly not only realize the electronic heating function of a cigarette lighter and conveniently carry, but also have at least one charging interface to conveniently and optionally charge mobile phones, tablet computers and other electronic devices through the charging interface.

20 Claims, 3 Drawing Sheets

SPLIT-TYPE CAR CIGARETTE LIGHTER

BACKGROUND

Technical Field

The present disclosure generally relates to cigarette lighters field, and especially relates to a split-type car cigarette lighter.

Description of Related Art

Nowadays, with the development of the economy, people's living standards are getting higher and higher so that cars have entered thousands of families. A cigarette lighter interface of the car is capable of heating the cigarette lighter so that the cigarette lighter can reach the temperature at Inch the cigarette is lit. However, a conventional cigarette lighter only has the function of lighting a cigarette. When a person inside the car wants to charge their electronic equipments such as mobile phones or tablet computers via the cigarette lighter interface, he must replace the cigarette lighter with a car charger in order to solve the problem, which is very inconvenient.

SUMMARY

The disclosure relates to a split-type car cigarette lighter which may accordingly not only realize the electronic heating function of a cigarette lighter and conveniently carry, but also have at least one charging interface to conveniently and optionally charge mobile phones, tablet computers and other electronic devices through the charging interface.

In one aspect, a split-type car cigarette lighter includes: a cigarette lighting device including a first housing with a first receiving room therein, a first printed circuit board (PCB) and a battery re respectively received in the first receiving room and tightly fixed with the first housing, and a heating plate tightly fixed with the first housing, both the battery and the heating plate electrically connected to the first PCB. A car charging device is connected to the cigarette lighting device and includes a hollow-cylinder second housing with a lower end opening thereof. The second housing includes a circular upper wall and a cylindrical sidewall connected to the upper wall, which the upper wall includes a first mounting, recess extending downward from the middle of the upper wall along an axial direction of the second housing, at least one electrical contact protruding upward from a bottom plate of the first mounting recess. The heating plate is electrically connected to the at least one electrical contact when the cigarette lighting device is partially received in the first mounting recess and movably connected to the second housing.

Wherein the heating plate is disc-shaped and includes a heating portion extending downward along an axial direction of the heating plate and electrically connected to the first PCB, the heating plate is made of heat-resistant material capable of withstanding the heat generated by the heating portion.

Wherein the cigarette lighting device further includes a switch tightly fixed with one end of the first housing away from the heating plate and electrically connected to the first PCB. When the switch is activated, the heating plate heats and ignites the cigarette by consuming electrical power within the battery.

Wherein the car charging device further includes a third housing cooperatively connected to the second housing to cooperatively form a second receiving room therebetween.

Wherein the third housing is generally, a stepped-hollow-cylinder structure with an upper end opening thereof, and the second housing overlying on the upper end of the third housing. The third housing includes a first hollow-cylinder-shaped body portion, a connecting portion connected to the bottom of the first body portion and a second body portion connected to the bottom of the connecting portion. The first body portion, the connecting portion and the second body portion are coaxially formed with each other, and the radial diameter of the second body portion is smaller than that of the first body portion and the radial diameter of the first body portion is smaller than that of the connecting portion.

Wherein the car charging device further includes a second printed circuit board (PCB) received in the second receiving room and tightly fixed with the third housing.

Wherein the at least one electrical contact is electrically connected to the second PCB.

Wherein the car charging device further includes a first port and a second port each perpendicularly and electrically connected to the second PCB and formed parallel to each other.

Wherein the car charging device further includes a first U-shaped electrical device electrically connected to a low portion of the second PCB and a second spring-shaped electrical device electrically connected to the bottom of the second PCB.

Wherein the car charging device further includes a pair of first terminals extending along an axial direction of the third housing and symmetrically arranged on the lateral wall of the second body portion to movably connect with the second body portion, and a second terminal extending downward from the bottom of the second body, portion along the axial direction of the third housing to movably connect with the second body portion, the pair of first terminals electrically connected to two opposite ends of the first electrical device and the second terminal electrically connected to the second electrical device.

Wherein the second housing further includes a second mounting recess and a third mounting recess respectively arranged on the sidewall along the radial direction of the second housing. The second mounting recess is positioned on the upper end of the third mounting recess and corresponding to the first port and the third mounting recess is corresponding to the second port. The third housing includes a fourth mounting recess extending from the upper end of the outer circumferential sidewall of the first body portion to the connecting portion along the axial direction of the first body portion for the first and second ports respectively passing through the fourth mounting recess.

Wherein the first housing is generally a hollow-cylinder structure with a lower end opening thereof, the diameter of the first housing is consistent with that of the first mounting recess and less than that of the second housing.

In another aspect, a split-type car cigarette lighter according to an exemplary embodiment of the present disclosure includes a cigarette lighting device including a hollow-cylinder first housing with a lower end opening thereof and a first receiving room therein, a disc-shaped first printed circuit board (PCB) and a cylindrical battery respectively received in the first receiving room and tightly fixed with the first housing, and a disc-shaped heating plate tightly fixed with the first housing, both the battery and the heating plate electrically connected to the first PCB. A car charging device is connected to the cigarette lighting device and includes a hollow-cylinder second housing with a lower end opening thereof. The second housing includes a circular upper wall and a cylindrical sidewall connected to the upper wall, the upper wall including a first mounting recess extending downward from the middle of the upper wall along an axial direction of the second housing, at least one electrical contact protruding upward from a bottom plate of the first mounting recess. The heating plate is electrically connected to the at least one electrical contact when the cigarette lighting device is partially received in the first mounting recess and movably connected to the second housing; the diameter of the first housing is consistent with that of the first mounting recess and less than that of the second housing.

Wherein the heating plate includes a heating portion extending downward along an axial direction of the heating plate and electrically connected to the first PCB and is made of heat-resistant material capable of withstanding the heat generated by the heating portion.

Wherein the cigarette lighting device further includes a switch tightly fixed with one end of the first housing away from the heating plate and electrically connected to the first PCB. When the switch is activated, the heating plate heats and ignites the cigarette by consuming electrical power within the battery.

Wherein the car charging device further includes a stepped-hollow-cylinder third housing, with an upper end opening thereof, connected to the second housing to cooperatively form a second receiving room therebetween, a second printed circuit board (PCB) received in the second receiving room, tightly fixed with the third housing and electrically connected to the at least one electrical contact. The second housing is overlying on the upper end of the third housing, and the third housing includes a first hollow-cylinder-shaped body portion, a connecting portion connected to the bottom of the first body portion and a second body portion connected to the bottom of the connecting portion. The first body portion, the connecting portion and the second body portion are coaxially formed with each other, and the radial diameter of the second body portion is smaller than that of the first body portion and the radial diameter of the first body portion is smaller than that of the connecting portion.

Wherein the car charging device further includes a first port and a second port each perpendicularly and electrically connected to the second PCB and formed parallel to each other.

Wherein the car charging device further includes a first U-shaped electrical device electrically connected to a low portion of the second PCB and a second spring-shaped electrical device electrically connected to the bottom of the second PCB.

Wherein the car charging device further includes a pair of first terminals extending along an axial direction of the third housing and symmetrically arranged on the lateral wall of the second body portion to movably connect with the second body portion, and a second terminal extending downward from the bottom of the second body portion along the axial direction of the third housing to movably connect with the second body portion. The pair of first terminals is electrically connected to two, opposite ends of the first electrical device and the second terminal is electrically connected to the second electrical device.

Wherein the second housing further includes a second mounting recess and a third mounting recess respectively arranged on the sidewall along the radial direction of the second housing. The second mounting recess is positioned on the upper end of the third mounting recess and corresponding to the first port and the third mounting recess is corresponding to the second port. The third housing includes a fourth mounting recess extending from the upper end of the outer circumferential sidewall of the first body portion to the connecting portion along the axial direction of the first body portion for the first and second ports respectively passing through the fourth mounting recess.

The present disclosure provides the advantages as below.

The split-type car cigarette liter can accordingly not only realize the electronic heating function of a cigarette lighter and conveniently carry, but also have at least one charging interface to conveniently and optionally charge mobile phones, tablet computers and other electronic devices through the charging interface.

DETAILED DESCRIPTION

Figure 1:
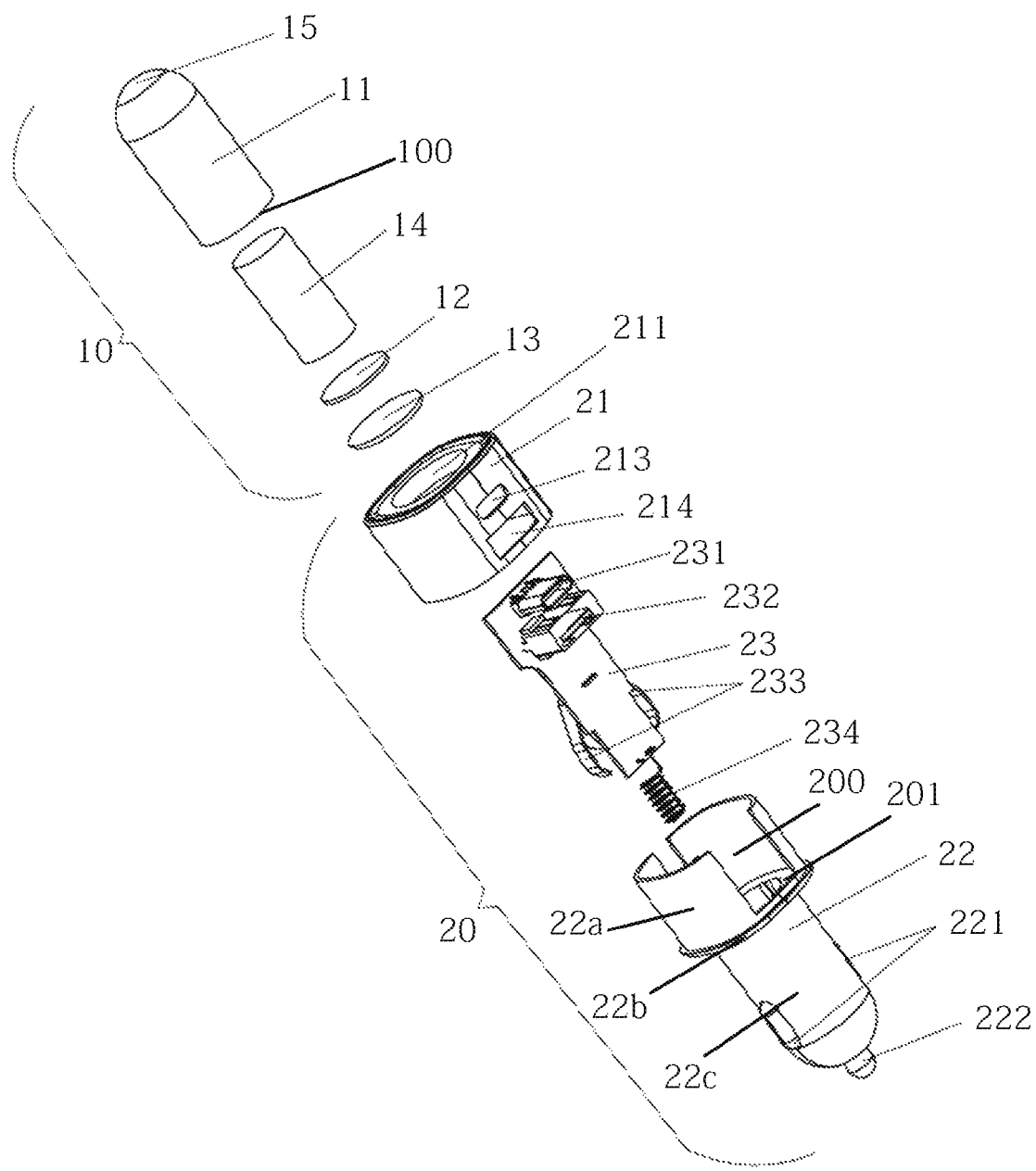
FIG. 1 is an exploded, schematic view of the split-type car cigarette lighter in accordance with an exemplary embodiment.

The disclosure is illustrated by way of example and not by way of limitation in the figures of the accompanying drawings, in which like reference numerals indicate similar elements.

Referring to FIGS. 1-4, the split-type car cigarette lighter according to an exemplary embodiment includes a cigarette lighting device 10 including a hollow-cylinder first housing 11 with a lower end opening thereof and a first receiving room 100 therein, a disc-shaped first printed circuit board (PCB) 12 and a cylindrical battery 14 respectively received in the first receiving room 100 and tightly fixed with the first housing 11, and a disc-shaped heating plate 13 tightly fixed with the first housing 11. Both the battery 14 and the heating plate 13 are electrically connected to the first PCB 12. A car charging device 20 is connected to the cigarette lighting device 10 and includes a hollow-cylinder second housing 21 with a lower end opening thereof. The second housing 21 includes a circular upper wall 21*a* and a cylindrical sidewall 21*b* connected to the upper wall 21*a*. The upper wall 21*a* includes a first mounting recess 211 extending downward from the middle of the upper wall 21*a* along an axial direction of the second housing 21, at least one electrical contact 212 protruding upward from a bottom plate 211*a* of the first mounting recess 211. The heating plate 13 is electrically corrected to the at least one electrical contact 212 when the cigarette lighting device 10 is partially received in the first mounting recess 211 and movably connected to the second housing 21.

In the exemplary embodiment of the present disclosure, the diameter of the first housing 11 is consistent with that of the first mounting recess 211 and less than that of the second housing 21.

In the exemplary embodiment of the present disclosure, the cigarette lighting device 10 is movably connected to the car charging device 20, thereby the cigarette lighting device 10 can be charged by the at least one electrical contact 212. The cigarette lighting device 10 can realize the electronic heating function of a cigarette lighter and conveniently carry after the cigarette lighting device 10 is pulled out of the first mounting recess 211. When the split-type car cigarette lighter is inserted into a cigarette lighter interface, the battery 14 can be charged by the at least one electrical contact 212. Otherwise, when the cigarette lighting device 10 is pulled out of the first mounting recess 211, the battery 14 is provided for supplying power to the cigarette lighting device 10.

Figure 3:
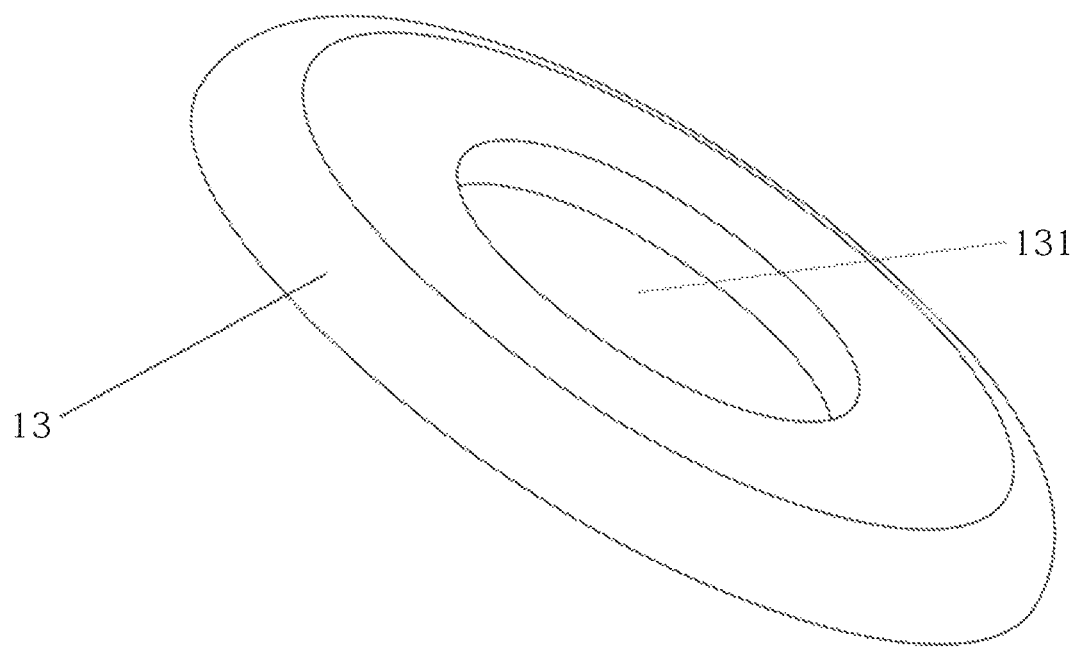
FIG. 3 is a schematic view of a heating plate of the split-type car cigarette lighter of FIG. 1.

Referring to FIG. 1 and FIG. 3, the heating plate 13 is disc-shaped and includes a heating portion 131 extending downward along an axial direction of the heating plate 13 and electrically connected to the first PCB 12. The heating plate 13 is made of heat-resistant material capable of withstanding the heat generated by the heating portion 131.

In the exemplary embodiment of the present disclosure, the heating portion 131 is a tungsten filament heating body so that it is capable of generating more heat under a lower power consumption to ensure the on-board ability of the split-type car cigarette lighter after the cigarette lighting device 10 is pulled out of the first mounting recess 211. The heating plate 13 is made of heat-resistant material, which can ensure that the split-type car cigarette lighter is not damaged by heat generated from the heating portion 131.

Figure 4:
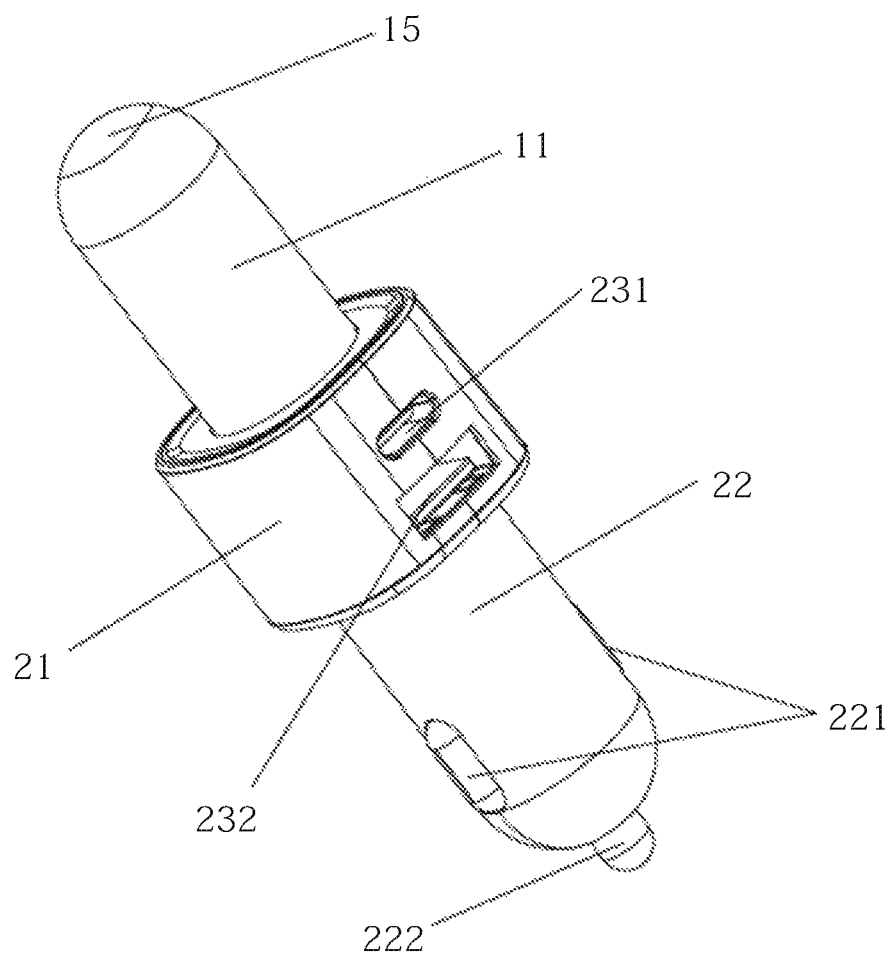
FIG. 4 is a schematic assembly view of the split-type car cigarette lighter of FIG. 1.

Referring to FIG. 1, FIG. 3 and FIG. 4, the cigarette lighting device 10 further includes a switch 15 tightly fixed with one end of the first housing 11 away from the heating plate 13 and electrically connected to the first PCB 12. When the switch 15 is activated, the heating plate 13 heats and ignites the cigarette by consuming electrical power within the battery 14.

In the exemplary embodiment of the present disclosure, the switch 15 is a button switch structure and is provided for controlling the heating portion 131 to heat. When needing to use the cigarette lighter function of the split-type car cigarette lighter, the cigarette lighting device 10 is first pulled out of the first mounting recess 211, and then the switch 15 is pressed along the axial direction of the cigarette lighting device 10. At this time, the heating portion 131 consumes the power within the battery 14 to start heating the cigarette. After the cigarette is ignited, the switch 15 is again pressed along the axial direction of the cigarette lighting device 10 to stop the heating portion 131 heating. The present disclosure of the split-type car cigarette lighter is provided with overload protection. When the temperature of the heating portion 131 reaches a preset temperature of the split-type car cigarette lighter, the heating portion 131 can be automatically stopped heating even if the switch 15 is not pressed again, thereby the user's safety is protected.

Referring to FIG. 1, FIG. 3 and FIG. 4 again, the car charging device 20 further includes a third housing 22 and a second PCB 23 respectively connected to the first housing 21. The second housing 21 is covered on the third housing 22 to cooperatively form a second receiving room 200 therebetween. The second PCB 23 is received in the second receiving room 200 and tightly fixed with the third housing 22, and the at least one electrical contact 212 is electrically connected to the second PCB 23.

In the exemplary embodiment of the present disclosure, the third housing 22 is generally a stepped-hollow-cylinder structure with an upper end opening thereof, and the second housing 22 is generally a hollow-cylinder structure with a lower end opening thereof. The second housing 21 is covered on the upper end of the third housing 22. The third housing 22 includes a first hollow-cylinder-shaped body portion 22a, a connecting portion 22b connected to the bottom of the first body portion 22a and a second body portion 22c connected to the bottom of the connecting portion 22b. The first body portion 22a, the connecting portion 22b and the second body portion 22c are coaxially formed with each other. The radial diameter of the second body portion 22c is smaller than that of the first body portion 22a and the radial diameter of the first body portion 22a is smaller than that of the connecting portion 22b.

In the exemplary embodiment of the present disclosure, the at least one electrical contact 212 is electrically connected to the second PCB 23. When the split-type car cigarette lighter is inserted into the cigarette lighter interface, the current is transmitted to the electrical contact 212 via the second PCB 23, thereby the battery 14 is charged by the electrical contact 212. The battery 14 is designed of a large-capacity to ensure that the duration of the cigarette lighting device 10 is sufficient.

Referring to FIG. 1 and FIG. 4, the car charging device 20 further includes a first U-shaped electrical device 233 tightly and electrically connected to a low portion of the second PCB 23 and a second spring-shaped electrical, device 234 tightly and electrically connected to the bottom of the second PCB 23. The car charging device 20 further includes a pair of first terminals 221 extending along the axial direction of the third housing 22 and symmetrically arranged on the lateral wall of the second body portion 22c to movably connect with the second body portion 22c, and a second terminal 222 extending downward from the bottom of the second body portion 22c alone the axial direction of the third housing 22 to movably connect with the second body portion 22c. The pair of first terminals 221 is electrically connected to two opposite ends of the first electrical device 233 and the second terminal 222 is electrically connected to the second electrical device 234.

In the exemplary embodiment of the present disclosure, when the split-type car cigarette lighter is inserted into the cigarette lighter interface, the pair of first terminals 221 and the second terminal 222 are partially received in the second receiving room 200 and each is electrically connected to the cigarette lighter interface so that the split-type car cigarette lighted electrically connected to the cigarette lighter interface. Thus, the electrical power is successfully supplied to the split-type car cigarette lighter by the cigarette lighter interface.

Figure 2:
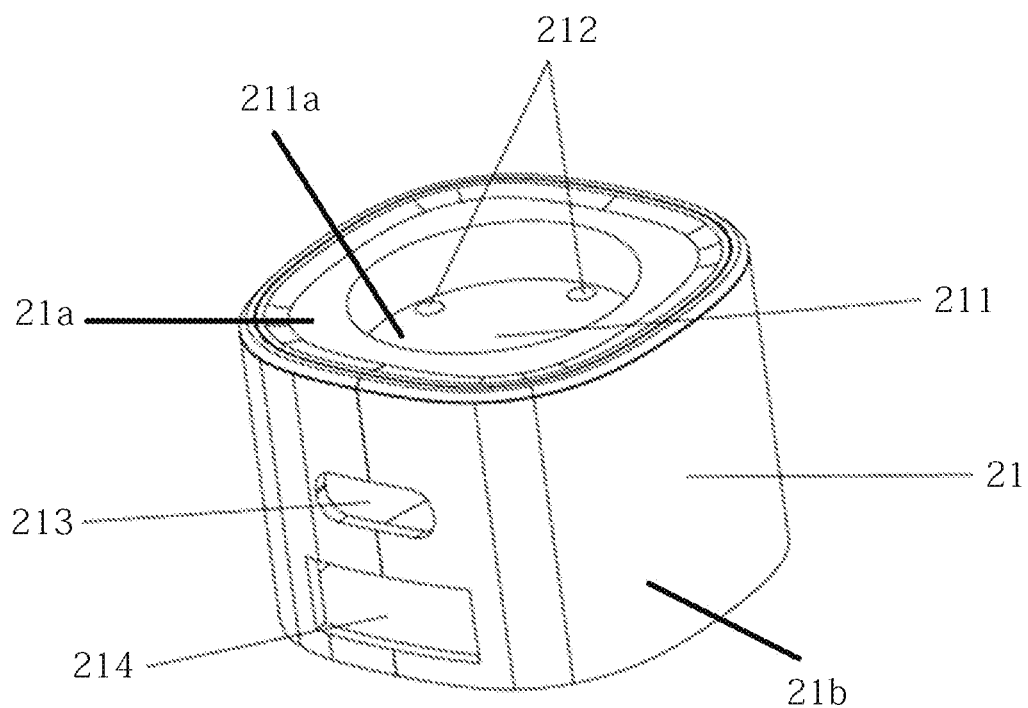
FIG. 2 is a schematic view of a second housing of the split-type car cigarette lighter of FIG. 1.

Referring to FIG. 1, FIG. 2 and FIG. 4, the car charging device 20 further includes a first port 231 and a second port 232 each perpendicularly and electrically connected, to the second PCB 23 and formed parallel to each other. The second housing 21 further includes a second mounting recess 213 and a third mounting recess 214 respectively arranged on the sidewall 21b along the radial direction of the second housing 21. The second mounting, recess 213 is positioned on the upper end of the third mounting recess 214 and corresponding to the first port 231, and the third mounting recess 214 is corresponding to the second port 232. Furthermore, the third housing 22 further includes a fourth mounting recess 201 extending from the upper end of the outer circumferential sidewall of the first body portion 22a to the connecting portion 22b along the axial direction of the first body portion 22a for the first and second ports 231, 232 respectively passing through the fourth mounting recess 201.

In the exemplary embodiment of the present disclosure, the size of the second mounting recess 213 is consistent with the first port 231, while the size of the third mounting recess 214 is also consistent with the second port 232. Both the first port 231 and the second port 232 are received in the second housing 21. In this way, the first and second ports 231, 232 can be protected from damaging by external subjects, thereby the span-life of the split-type car cigarette lighter is improved. The first port 231 is a DP3.0 port and the second port 232 is a USB port, which can meet the charge requirements of almost all mobile phones, tablets and other electronic devices on the market and ensure the use range of the split-type car cigarette lighter.

In the exemplary embodiment of the present disclosure, the fourth mounting recess 201 is extended from the upper end of the outer circumferential sidewall of the first body portion 22a to the connecting portion 22b along the axial direction of the first body portion 22a. The pair of first terminals 221 is symmetrically formed on the lower end of the second body portion 22c along the axial direction of the third housing 22, and the second terminal 222 is extended downward from the bottom of the second body portion 22c along the axial direction of the third housing 22.

In the exemplary embodiment of the present disclosure, the first mounting recess 211 is arranged on the middle of the upper wall 21a along the axial direction of the second housing 21. The second and third mounting recesses 213, 214 are respectively arranged on the sidewall 21b along the radial direction of the second housing 21. The second mounting recess 213 is positioned on the upper end of the third mounting recess 214 and corresponding to the first port 231, and the third mounting recess 214 is corresponding to the second port 232.

During usage of the split-type car cigarette lighter, the split-type car cigarette lighter is first inserted into the cigarette lighter interface, each of the pair of first terminals 221 and the second terminal 222 is electrically connected to the cigarette lighter interface so that the split-type car cigarette lighter is electrically connected to the cigarette lighter interface. At this time, the battery 14 is charged via the electrical contact 212, thereby the first port 231 and/or the second port 232 are connected by a data line to charge an external electrical device. When the cigarette lighting device 10 is disconnected from the car charging device 20, the switch 15 is activated along the axial direction of the cigarette lighting device 10 to drive the heating portion 131 start heating. At this time, the heating portion 131 consumes the power within the battery 14 to start heating the cigarette. After the cigarette is ignited, the switch 15 is again pressed along the axial direction of the cigarette lighting device 10 to stop the heating portion 131 heating. The cigarette lighting device 10 can accordingly realize the electronic heating function of a cigarette lighter and conveniently carry. Thus, The split-type car cigarette lighter can accordingly not only realize the electronic heating function of a cigarette lighter, but also have at least one charging interface to conveniently and optionally charge mobile phones, tablet computers and other electronic devices through the charging interface.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A split-type car cigarette lighter comprising:
a cigarette lighting device comprising a first housing with a first receiving room therein, a first printed circuit board (PCB) and a battery respectively received in the first receiving room and tightly fixed with the first housing, and a heating plate tightly fixed with the first housing, both the battery and the heating plate electrically connected to the first PCB;
a car charging device connected to the cigarette lighting device and comprising a hollow-cylinder second housing with a lower end opening thereof, the second housing comprising a circular upper wall and a cylindrical sidewall connected to the upper wall, the upper wall comprising a first mounting recess extending downward from a middle of the upper wall along an axial direction of the second housing, at least one electrical contact protruding upward from a bottom plate of the first mounting recess; and wherein
the heating plate is electrically connected to the at least one electrical contact when the cigarette lighting device is partially received in the first mounting recess and movably connected to the second housing.

2. The split-type car cigarette lighter as claimed in claim 1, wherein the heating plate is disc-shaped and comprises a heating portion extending downward along an axial direction of the heating plate and electrically connected to the first PCB, and the heating plate is made of heat-resistant material capable of withstanding the heat generated by the heating portion.

3. The split-type car cigarette lighter as claimed in claim 2, wherein the cigarette lighting device further comprises a switch tightly fixed with one end of the first housing away from the heating plate and electrically connected to the first PCB; when the switch is activated, the heating plate heats and ignites the cigarette by consuming electrical power within the battery.

4. The split-type car cigarette lighter as claimed in claim 1, wherein the car charging device further comprises a third housing cooperatively connected to the second housing to cooperatively form a second receiving room therebetween.

5. The split-type car cigarette lighter as claimed in claim 4, wherein the third housing is generally a stepped-hollow-cylinder structure with an upper end opening thereof, and the second housing overlying on the upper end of the third housing; the third housing comprising a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the first body portion and the radial diameter of the first body portion smaller than that of the connecting portion.

6. The split-type car cigarette lighter as claimed in claim 5, wherein the car charging device further comprises a second printed circuit board (PCB) received in the second receiving room and tightly fixed with the third housing.

7. The split-type car cigarette lighter as claimed in claim 6, wherein the at least one electrical contact is electrically connected to the second PCB.

8. The split-type car cigarette lighter as claimed in claim 7, wherein the car charging device further comprises a first port and a second port each perpendicularly and electrically connected to the second PCB and formed parallel to each other.

9. The split-type car cigarette lighter as claimed in claim 8, wherein the car charging device further comprises a first U-shaped electrical device electrically connected to a low portion of the second PCB and a second spring-shaped electrical device electrically connected to the bottom of the second PCB.

10. The split-type car cigarette lighter as claimed in claim 9, wherein the car charging device further comprises a pair of first terminals extending along an axial direction of the third housing and symmetrically arranged on the lateral wall of the second body portion to movably connect with the second body portion, and a second terminal extending downward from the bottom of the second body portion along the axial direction of the third housing to movably connect with the second body portion, the pair of first terminals electrically connected to two opposite ends of the first electrical device and the second terminal electrically connected to the second electrical device.

11. The split-type car cigarette lighter as claimed in claim 10, wherein the second housing further comprises a second mounting recess and a third mounting recess respectively arranged on the sidewall along the radial direction of the second housing, the second mounting recess positioned on the upper end of the third mounting recess and corresponding to the first port and the third mounting recess corresponding to the second port; the third housing further including a fourth mounting recess extending from the upper end of the outer circumferential sidewall of the first body portion to the connecting portion along the axial direction of the first body portion for the first and second ports respectively passing through the fourth mounting recess.

12. The split-type car cigarette lighter as claimed in claim 11, wherein the first housing is generally a hollow-cylinder structure with a lower end opening thereof, the diameter of the first housing is consistent with that of the first mounting recess and less than that of the second housing.

13. A split-type car cigarette lighter comprising:
a cigarette lighting device comprising a hollow-cylinder first housing with a lower end opening thereof and a first receiving room therein, a disc-shaped first printed circuit board (PCB) and a cylindrical battery respectively received in the first receiving room and tightly fixed with the first housing, and a disc-shaped heating plate tightly fixed with the first housing, both the battery and the heating plate electrically connected to the first PCB;
a car charging device connected to the cigarette lighting device and comprising a hollow-cylinder second housing with a lower end opening thereof, the second housing comprising a circular upper wall and a cylindrical sidewall connected to the upper wall, the upper wall comprising a first mounting recess extending downward from a middle of the upper wall along an axial direction of the second housing, at least one electrical contact protruding upward from a bottom plate of the first mounting recess; and wherein
the heating plate is electrically connected to the at least one electrical contact when the cigarette lighting device is partially received in the first mounting recess and movably connected to the second housing; the diameter of the first housing is consistent with that of the first mounting recess and less than that of the second housing.

14. The split-type car cigarette lighter as claimed in claim 13, wherein the heating plate comprises a heating portion extending downward along an axial direction of the heating plate and electrically connected to the first PCB, and the heating plate is made of heat-resistant material capable of withstanding the heat generated by the heating portion.

15. The split-type car cigarette lighter as claimed in claim 14, wherein the cigarette lighting device further comprises a switch tightly fixed with one end of the first housing away from the heating plate and electrically connected to the first PCB; when the switch is activated, the heating plate heats and ignites the cigarette by consuming electrical power within the battery.

16. The split-type car cigarette lighter as claimed in claim 15, wherein the car charging device further comprises a stepped-hollow-cylinder third housing, with an upper end opening thereof, connected to the second housing to cooperatively form a second receiving room therebetween, a second printed circuit board (PCB) received in the second receiving room, tightly fixed with the third housing and electrically connected to the at least one electrical contact; the second housing overlying on the upper end of the third housing; the third housing comprising a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the first body portion and the radial diameter of the first body portion smaller than that of the connecting portion.

17. The split-type car cigarette lighter as claimed in claim 16, wherein car charging device further comprises a first port and a second port each perpendicularly and electrically connected to the second PCB and formed parallel to each other.

18. The split-type car cigarette lighter as claimed in claim 17, wherein car charging device further comprises a first U-shaped electrical device electrically connected to a low portion of the second PCB and a second spring-shaped electrical device electrically connected to the bottom of the second PCB.

19. The split-type car cigarette lighter as claimed in claim 18, wherein car charging device further comprises a pair of first terminals extending along an axial direction of the third housing and symmetrically arranged on the lateral wall of the second body portion to movably connect with the second body portion, and a second terminal extending downward from the bottom of the second body portion along the axial direction of the third housing to movably connect with the second body portion, the pair of first terminals electrically connected to two opposite ends of the first electrical device and the second terminal electrically connected to the second electrical device.

20. The split-type car cigarette lighter as claimed in claim 19, wherein the second housing further comprises a second mounting recess and a third mounting recess respectively arranged on the sidewall along the radial direction of the second housing, the second mounting recess positioned on the upper end of the third mounting recess and corresponding to the first port and the third mounting recess corresponding to the second port; the third housing further including a fourth mounting recess extending from the upper end of the outer circumferential sidewall of the first body portion to the connecting portion along the axial direction of the first body portion for the first and second ports respectively passing through the fourth mounting recess.

* * * * *